US007411542B2

(12) United States Patent
O'Boyle

(10) Patent No.: US 7,411,542 B2
(45) Date of Patent: Aug. 12, 2008

(54) AUTOMOTIVE RADAR SYSTEM WITH GUARD BEAM

(75) Inventor: Michael E. O'Boyle, Howell, MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 97 days.

(21) Appl. No.: 11/307,531

(22) Filed: Feb. 10, 2006

(65) Prior Publication Data

US 2006/0267830 A1 Nov. 30, 2006

Related U.S. Application Data

(60) Provisional application No. 60/593,763, filed on Feb. 10, 2005.

(51) Int. Cl.
*G01S 13/93* (2006.01)

(52) U.S. Cl. ............................ 342/70; 342/71; 342/72; 340/903; 340/435; 340/436

(58) Field of Classification Search ............ 342/70–72, 342/118, 159, 175; 340/903, 435, 436
See application file for complete search history.

(56) References Cited

U.S. PATENT DOCUMENTS

| | | | | |
|---|---|---|---|---|
| 2,888,674 | A | 5/1959 | Moreno | 342/59 |
| 3,000,007 | A | 9/1961 | Hansford et al. | 342/175 |
| 3,170,158 | A | 2/1965 | Rotman et al. | |
| 3,754,270 | A | 8/1973 | Thies | |
| 3,761,936 | A | 9/1973 | Archer et al. | |
| 4,041,487 | A | 8/1977 | Evans et al. | 342/91 |
| 4,090,197 | A | 5/1978 | Cantrell | |
| 4,096,480 | A | 6/1978 | Miner et al. | |
| 4,096,805 | A | 6/1978 | Miner et al. | |
| 4,110,752 | A | 8/1978 | Neri | 342/77 |
| 4,222,054 | A | 9/1980 | Capps | |

(Continued)

FOREIGN PATENT DOCUMENTS

EP 0 427 470 B1 9/1996

(Continued)

OTHER PUBLICATIONS

"Approaches to Radar Signal Processing", Booth, IEEE Computer Society, Jun. 1, 1983, vol. 16 No 6, Ps. 32-43.*
Yngvesson et al., "The tapered slot antenna—a new integrated element for mm-wave applications," IEEE Trans. on Microwave Theory and Techniques, MTT-37, No. 2, Feb. 1989, pp. 365-374.
Schoenberg et al., "Two-Level Power Combining Using a Lens Amplifier," IEEE Transactions on Microwave Theory and Techniques, vol. 42, No. 12, Dec. 1994, pp. 2480-2485.
Hollung et al., "A Bi-Directional Quasi-Optical Lens Amplifier", IEEE Transactions on Microwave Theory and Techniques, vol. 45, No. 12, Dec. 1997, pp. 2352-2357.

(Continued)

*Primary Examiner*—John B Sotomayor
(74) *Attorney, Agent, or Firm*—Raggio & Dinnin, P.C.

(57) ABSTRACT

A predictive collision radar system in a vehicle incorporates a first antenna and a guard antenna, the associated radiation patterns of which overlap with one another, but the radiation pattern of the guard antenna is broader than that of the first antenna. A comparison of signals from the first and guard antennas provides for rejecting targets that are not likely a threat to the vehicle. In one embodiment the first antenna is a multi-beam antenna with an electromagnetic lens, for example, either dielectric or planar, and a signal from a forward looking element thereof is compared with the signal from the guard antenna aligned therewith. In another embodiment, an electromagnetic lens is adapted to cooperate with the guard antenna so as to provide for forming the associated radiation pattern.

16 Claims, 5 Drawing Sheets

U.S. PATENT DOCUMENTS

| | | | |
|---|---|---|---|
| 4,268,831 A | 5/1981 | Valentino et al. | |
| 4,288,795 A | 9/1981 | Shelton | |
| 4,319,242 A | 3/1982 | Lewis | 342/67 |
| 4,348,678 A | 9/1982 | Thomas | 343/754 |
| 4,381,509 A | 4/1983 | Rotman et al. | |
| 4,641,144 A | 2/1987 | Prickett | 343/754 |
| 4,743,907 A | 5/1988 | Gellekink | 342/59 |
| 4,769,646 A | 9/1988 | Raber et al. | 343/753 |
| 4,845,507 A | 7/1989 | Archer et al. | |
| 4,905,014 A | 2/1990 | Gonzalez et al. | |
| 4,975,705 A | 12/1990 | Gellekink et al. | 342/52 |
| 5,047,785 A | 9/1991 | Julian | |
| 5,099,253 A | 3/1992 | Archer | |
| 5,274,389 A | 12/1993 | Archer et al. | |
| 5,278,564 A | 1/1994 | Groenenboom | 342/123 |
| 5,347,287 A | 9/1994 | Speciale | |
| 5,428,364 A | 6/1995 | Lee et al. | |
| 5,442,362 A | 8/1995 | Zwarts | 342/176 |
| 5,486,832 A | 1/1996 | Hulderman | |
| 5,504,718 A | 4/1996 | Gaynor | 367/138 |
| 5,583,511 A | 12/1996 | Hulderman | |
| 5,821,908 A | 10/1998 | Sreenivas | |
| 5,874,915 A | 2/1999 | Lee et al. | |
| 5,892,487 A | 4/1999 | Fujimoto et al. | |
| 5,894,288 A | 4/1999 | Lee et al. | |
| 5,926,134 A | 7/1999 | Pons et al. | |
| 5,933,109 A | 8/1999 | Tohya et al. | |
| 5,952,962 A | 9/1999 | Dybdal | |
| 5,959,578 A | 9/1999 | Kreutel, Jr. | |
| 6,031,483 A | 2/2000 | Urabe et al. | |
| 6,031,501 A | 2/2000 | Rausch et al. | |
| 6,037,894 A | 3/2000 | Pfizenmaier et al. | |
| 6,037,896 A | 3/2000 | Dekker | 342/119 |
| 6,198,449 B1 | 3/2001 | Muhlhauser et al. | |
| 6,317,094 B1 | 11/2001 | Wu et al. | |
| 6,362,788 B1 | 3/2002 | Louzir | |
| 6,377,212 B1 | 4/2002 | Kinghorn et al. | |
| 6,424,319 B2 | 7/2002 | Ebling et al. | 343/911 L |
| 6,426,814 B1 | 7/2002 | Berger et al. | |
| 6,580,385 B1 | 6/2003 | Winner et al. | 342/70 |
| 6,590,544 B1 | 7/2003 | Filipovic | |
| 6,606,077 B2 | 8/2003 | Ebling et al. | 343/911 L |
| 6,867,741 B2 | 3/2005 | Schaffner et al. | |
| 6,897,819 B2 | 5/2005 | Henderson et al. | 343/713 |
| 6,977,610 B2 | 12/2005 | Brookner et al. | 342/59 |
| 6,982,676 B2 | 1/2006 | Sievenpiper et al. | |
| 7,042,420 B2 | 5/2006 | Ebling et al. | |
| 7,075,485 B2 | 7/2006 | Song et al. | |
| 7,275,431 B2 * | 10/2007 | Zimmermann et al. | 73/510 |
| 2005/0068251 A1 | 3/2005 | Ebling et al. | 343/911 L |
| 2005/0116854 A1 | 6/2005 | Beez et al. | 342/70 |
| 2005/0219126 A1 | 10/2005 | Rebeiz et al. | 343/700 MS |
| 2005/0285776 A1 | 12/2005 | Miosga et al. | 342/70 |
| 2006/0028386 A1 | 2/2006 | Ebling et al. | |
| 2006/0267830 A1 * | 11/2006 | O'Boyle | 342/70 |
| 2007/0182587 A1 * | 8/2007 | Danz | 340/903 |
| 2007/0273490 A1 * | 11/2007 | Fuchs et al. | 340/435 |
| 2007/0279199 A1 * | 12/2007 | Danz et al. | 340/435 |

FOREIGN PATENT DOCUMENTS

| | | |
|---|---|---|
| EP | 0 483 686 B1 | 5/2007 |
| JP | 11-271436 A | 10/1999 |
| JP | 2002-174680 A | 6/2002 |
| WO | 92/13373 A1 | 8/1992 |
| WO | 2005/116680 A1 | 12/2005 |
| WO | WO 2006086605 A3 * | 8/2006 |

OTHER PUBLICATIONS

Sugawara et al., "A mm-wave tapered slot antenna with improved radiation pattern," 1997 IEEE MTT-S Int. Micorwave Symp. Dig., Anaheim, CA, Jun. 1997, pp. 959-962.

Popovic et al., "Quasi-Optical Transmit/Receive Front Ends", IEEE Transactions on Microwave Theory and Techniques, vol. 46, No. 11, Nov. 1998, pp. 1964-1975.

Deal et al., "A new quasi-yagi antenna for planar active antenna arrays," IEEE Trans. Microwave Theory Tech., vol. 48, No. 6, Jun. 2000, pp. 910-918.

Schoenlinner et al., "77 GHz Transceiver Module Using A Low Dielectric Constant Multilayer Structure," 30th European Microwave Conference Paris France Oct. 2-6, 2000, Oct. 2000, pp. 245-248.

Vian et al., "A Transmit/Receive Active Antenna with Fast Low-Power Optical Switching", IEEE Transactions on Microwave Theory and Techniques, vol. 48, No. 12, Dec. 2000, pp. 2686-2691.

Schoenlinner et al., "Spherical-Lens Antennas for Millimeter Wave Radars," European Microwave Week 2001 Proc., vol. 3, Sep. 2001, pp. 317-320.

Popovic et al., "Multibeam Antennas with Polarization and Angle Diversity", IEEE Transactions on Antennas and Propogation, vol. 50, No. 5, May 2002, pp. 651-657.

Schoenlinner et al., "Compact Multibeam Imaging Antenna for Automotive Radars," 2002 IEEE MTT-S Digest, Jun. 2002, pp. 1373-1376.

Schoenlinner et al., "Wide-Scan Spherical-Lens Antennas for Automotive Radars," IEEE Transactions on Microwave Theory and Techniques, vol. 50, No. 9, Sep. 2002, pp. 2166-2175.

Romisch et al., "Multi-Beam Discrete Lens Arrays with Amplitude Controlled Steering", IEEE International Microwave Symposium Digest, vol. 1-3, TH4B-1, Jun. 9-11, 2003, pp. 1669-1672.

Abbaspour-Tamijani et al., "A planar filter-lens-array for millimeter-wave applications," IEEE 2004 AP-S Int. Symp. Dig., Monterey, CA, Jun. 2004.

Grajek et al., "A 24-GHz High-Gain Yagi-Uda Antenna Array," IEEE Transactions on Antennas and Propagation, May 2004, pp. 1257-1261.

Schoenlinner, B., "Compact Wide Scan Angle Antennas for Automotive Applications and RF MEMS Switchable Frequency Selective Surfaces", Ph. D. Dissertation, University of Michigan, Feb. 2004.

Pozar et al., "Scan Blindness in Infinite Phased Arrays of Printed Dipoles," IEEE Trans. Antennas Prop., vol. AP-32, No. 6, pp. 602-610, Jun. 1984.

McGrath, D. T ., "Planar Three-Dimensional Constrained Lenses," Trans. Antennas Prop., vol. AP-34, No. 1, pp. 46-50, Jan. 1986.

Pozar, D. M., "Flat lens antenna concept using aperture coupled microstrip patches," Electronic Letters, vol 32, pp. 2109-2111, Nov. 1996.

Pozar et al., "Design of Millimeter Wave Microstrip Reflectarrays," IEEE Trans. Antennas Prop., vol. 45, No. 2, pp. 287-296, Feb. 1997.

Gresham et al., "A compact manufactureable 76-77-GHz radar module for commercial ACC applications," IEEE Trans. on Microwave Theory and Techniques, vol. 49, No. 1, Jan. 2001, pp. 44-58.

Menzel et al., "A 76 GHz multiple-beam planar relfector antenna," 32nd European Microwave Conf. Proc., Sep. 2001, pp. 977-980.

Abbaspour-Tamijani et al., "AntennaFilterAtnenna Arrays as a Class of Bandpass Frequency-Selective Surfaces," IEEE Trans. Microwave Theory Tech., vol. 52, No. 8, pp. 1781-1789, Aug. 2004.

White et al.; "A wide-scan printed planar K-band microwave lens," Antennas and Propagation Society International Symposium, 2005 IEEE, vol. 4A, Jul. 3-8, 2005 pp. 313-316 vol. 4A.

PCT/US065/04672, International Search Report and Written Opinion of the International Searching Authority, Jan. 3, 2007, 8 pages.

* cited by examiner

AUTOMOTIVE RADAR SYSTEM WITH GUARD BEAM

CROSS-REFERENCE TO RELATED APPLICATIONS

The instant application claims benefit of prior U.S. Provisional Application Ser. No. 60/593,763 filed on 10 Feb. 2005, which is incorporated herein by reference. The following applications are also incorporated herein by reference: U.S. application Ser. No. 10/907,305 filed on 28 Mar. 2005 claiming benefit of U.S. Provisional Application Ser. No. 60/521,284 filed on 26 Mar. 2004 and U.S. application Ser. No. 11/161,681 filed on 11 Aug. 2005 claiming benefit of U.S. Provisional Application Ser. No. 60/522,077 filed on 11 Aug. 2004. U.S. Pat. Nos. 6,424,319, 6,085,151 and 5,969,667 are also incorporated herein by reference.

DETAILED DESCRIPTION OF EMBODIMENT(S)

Figure 1:
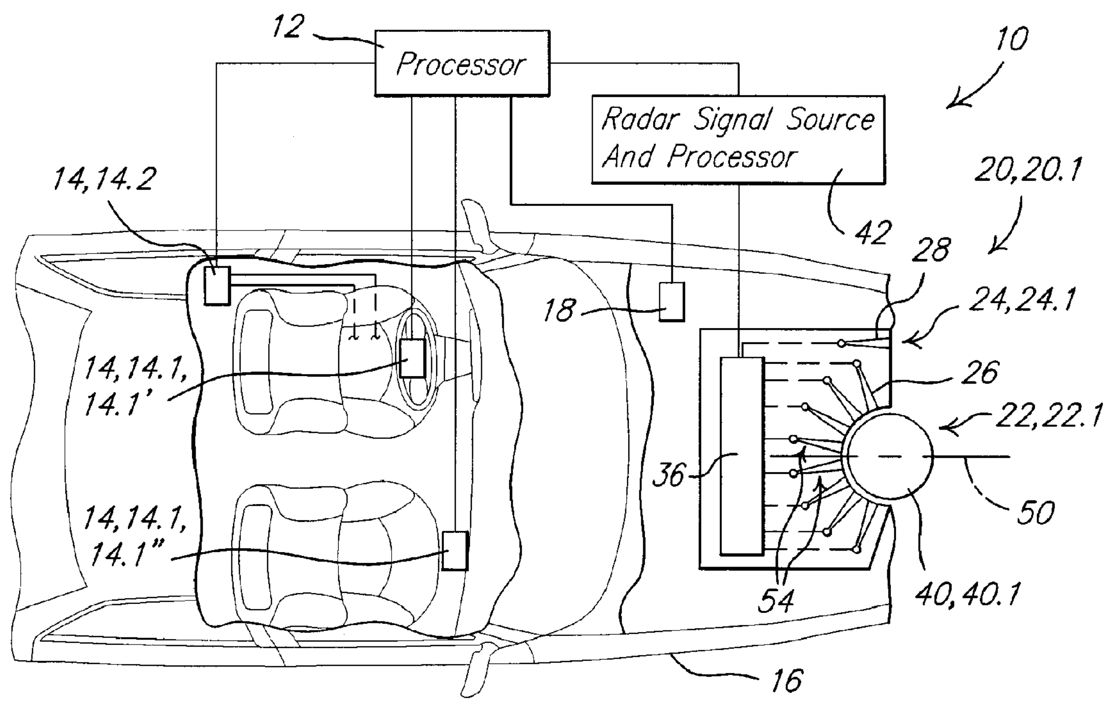
FIG. 1 illustrates a vehicle incorporating a multi-beam antenna and a guard antenna in cooperation with a vehicle safety system.

Referring to FIG. 1, a predictive collision radar system 10 provides for employing various countermeasures to improve crash safety prior to crash events, for example, by providing closing rate and/or angle of arrival information, prior to impact, to an associated safety system control processor 12, for example, so as to provide for modifying an associated deployment threshold or deployment time of an associated safety system 14 in a host vehicle 16. Various safety systems 14 may be controlled responsive to signals from a predictive collision radar system 10 and an associated crash sensor 18 incorporated in the host vehicle 16. Examples of such safety systems 14 include, but are not limited to, air bag systems 14.1 (e.g. driver-side air bag systems 14.1' or passenger-side air bag systems 14.1") with either fixed or controllable inflation characteristics, seat belt pretensioners 14.2, or reversible restraint systems, e.g., motorized seat belts, or reconfigurable seat systems.

Figure 2:
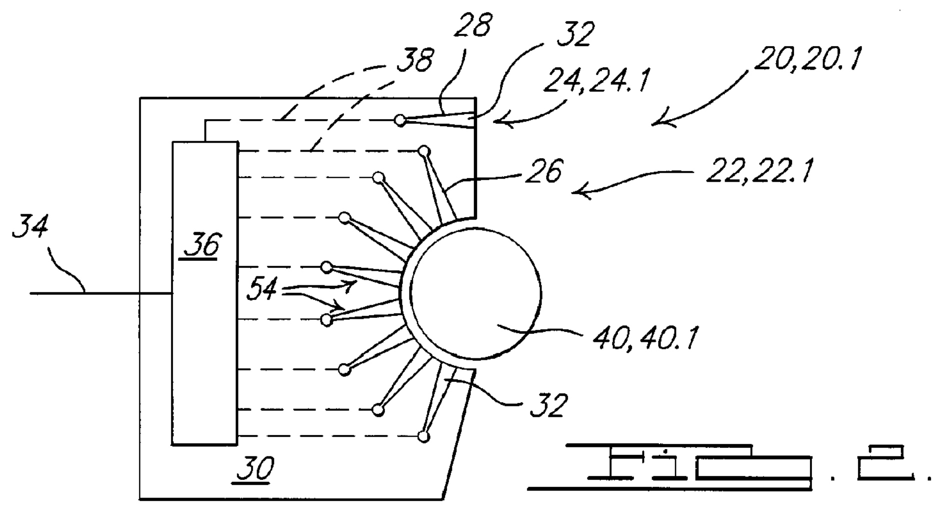
FIG. 2 illustrates a first embodiment of a combination of a guard antenna and a multi-beam antenna in cooperation with a dielectric electromagnetic lens.

The predictive collision radar system 10 comprises an associated antenna system 20 comprising a first antenna, for example, a multi-beam antenna 22, and a guard antenna 24. Referring to FIGS. 1 and 2, in a first embodiment of the antenna system 20.1, the feeds 26 of the associated first embodiment of the multi-beam antenna 22.1, and the feed 28 of the associated first embodiment of the guard antenna 24.1 comprise end-feed antenna elements, for example, Fermi taper slot antenna elements or other tapered slot antenna elements, for example, as illustrated in FIGS. 1-5 of U.S. application Ser. No. 10/907,305, and the associated description, all of which is incorporated herein by reference. The feeds 26, 28 are, for example, constructed in a conductive layer 30 on a common dielectric substrate 32, e.g. DUROID®, for example, as disclosed in U.S. Pat. No. 6,424,319 and U.S. application Ser. No. 10/907,305, both of which are incorporated herein by reference. The feeds 26, 28 are, for example, operatively coupled to a corporate feed 34 of an associated switching network 36, for example, in accordance with the teachings of U.S. Pat. No. 6,424,319 and U.S. application Ser. No. 10/907,305, both of which are incorporated herein by reference. For example, in one embodiment, individual feeds 26, 28 are coupled to associated ports of the switching network 36 via conductive traces 38 on the side of the dielectric substrate 32 opposite to the conductive layer 30 of the feeds 26, 28, for example, as illustrated in FIGS. 6-9 of U.S. application Ser. No. 10/907,305, which is incorporated herein by reference. The feeds 26 of the multi-beam antenna 22.1 cooperate with a dielectric electromagnetic lens 40, e.g. a spherical electromagnetic lens 40.1, for example, in accordance with the teachings of U.S. Pat. No. 6,424,319, which is incorporated herein by reference. The corporate feed 34 is operatively coupled to a radar signal source and processor 42 which provides for generating the transmitted radar signal and for receiving and processing the associated radar return signal, for example, in accordance with the teachings of U.S. Pat. Nos. 5,969,667 and 6,085,151, which are incorporated herein by reference. The radar signal source and processor 42 is operatively coupled to the safety system control processor 12, and, for example, in one embodiment, outputs the amplitude and range information detected by the radar signal source and processor 42 for each beam of the multi-beam antenna 22. Alternatively, the functionality of the radar signal source and processor 42 and the safety system control processor 12 may be combined in a single processor, or the selection of particular beams may be controlled responsive to the safety system control processor 12.

Figure 3:
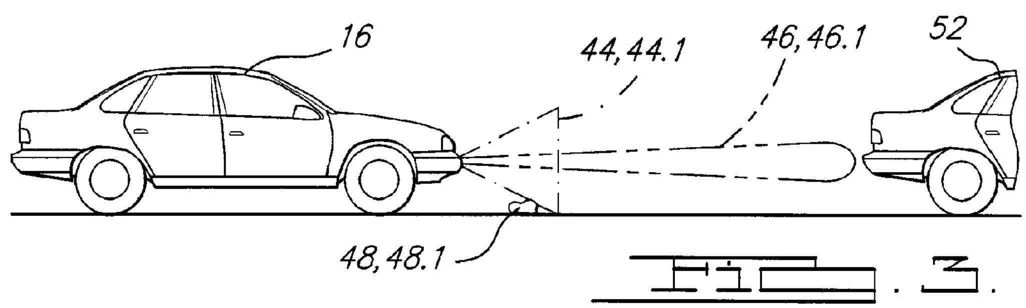
FIG. 3 illustrates a side view of elevation beam patterns of a beam of a multi-beam antenna and a beam of a first embodiment of a guard antenna.

Referring to FIG. 3, the radiation pattern 44 of the guard antenna 24 exhibits a substantially wider antenna beamwidth and correspondingly lower gain than the corresponding radiation pattern 46 of a corresponding beam of the multi-beam antenna 22. A signal path involving the multi-beam antenna 22 normally used for target detection will be referred to herein as a "multi-beam channel" and a signal received therethrough will be referred to as a "multi-beam channel signal." Similarly a signal path involving the guard antenna 24 will be referred to herein as a "guard channel" and a signal received therethrough will be referred to as a "guard channel signal." Accordingly, the multi-beam channel comprises a relatively narrow beam and a relatively higher gain, whereas the guard channel comprises a relatively wide beam and a relatively lower gain.

For example, referring to FIGS. 1 and 2, the guard channel is embodied with a first embodiment of a guard antenna 24.1 by providing a separate tapered slot feed 28 which does not radiate through the dielectric electromagnetic lens 40 of the multi-beam antenna 22.1, which provides for a substantially wider beamwidth in both the elevation and azimuth planes because the energy is not focused by the dielectric electromagnetic lens 40. For example, in one embodiment, the associated 3 dB antenna beamwidth of the guard antenna 24.1 is approximately 60° (i.e. ±30°). Referring to FIG. 2, a 9:1 RF switching network 36 cooperates with 8 separate paths for radiation through the dielectric electromagnetic lens 40 from the multi-beam antenna 22.1, and with a single separate path for radiation through the guard antenna 24.1.

Referring to FIG. 3, when using the predictive collision radar system 10 to control the safety system 14, it is beneficial to minimize the occurrence of false alarms, for example, in order to avoid prospective false warnings to a vehicle occupant, e.g. the driver; to avoid the triggering of reversible restraint systems; or to avoid the lowering of crash deployment thresholds when crashes are not imminent. One potential cause of false alarms arises from false targets 48 resulting from discontinuities or debris on the road surface, for example, which may result from cracks in the roadway, open manholes, rocks 48.1, or other debris laying on a roadway surface. A false alarm may also be caused by an overpass underneath which the host vehicle 16 travels. False targets 48 in the path of the host vehicle 16, for example, along the longitudinal axis 50 thereof, can be a common source of prospective false alarms. Off-axis objects are typically less of a concern because a high-speed object approaching from these directions would typically be traveling along the ground, and therefore likely a candidate for detection by the predictive collision radar system 10 rather than a false target 48 that if detected would result in a false alarm. Lower speed objects approaching from off-axis angles may be encountered during the course of turning the host vehicle 16, but under such conditions the approach speed would likely be sufficiently low so that false alarms would be of relatively little concern. As can be seen in FIG. 3, the respective elevation radiation patterns 42.1, 44.1 of the guard antenna 22 and the multi-beam antenna 20, respectively, are adapted so that a false target 48 would be illuminated substantially more by radiation from the guard antenna 22 than by radiation from the multi-beam antenna 20 so as to provide for distinguishing a false target 48 from a valid target 52, at a sufficient range from the host vehicle 16 so as to provide for precluding the actuation of an associated safety system 14 responsive to a false target 48 if the host vehicle 16 was not about to collide with a valid target 52, by making one or more comparisons between a multi-beam channel signal and a guard channel signal in accordance with what is referred to herein as a "guard test" in order to determine if a target lies in the main lobe of the multi-beam channel antenna beam.

An approximation for the mainlobe radiation pattern of a flat-plate antenna with a diameter a, and wavelength λ, is given as:

$$E(\phi) = \frac{\sin\left(\frac{\pi a}{\lambda}\sin(\phi)\right)}{\frac{\pi a}{\lambda}\sin(\phi)} \tag{1}$$

from page 231 of *Introduction to Radar Systems*, McGraw Hill, 1980 by Merrill I Skolnik, which is incorporated herein by reference, wherein E(ϕ) represents the voltage gain of the antenna in a direction ϕ relative to the principal axis of the antenna. For relatively narrow beamwidths, or reasonably large values of a/λ, the sin(ϕ) term can be replaced by ϕ. This simplified approximation can be used for values of a/λ at least as small as about 2. A value of a/λ equal to 2 results in a 3 dB antenna beamwidth of approximately 25° (±12.5°). Furthermore sin(x)/x=1/$\sqrt{2}$, i.e. −3 dB, for x equal to about 1.4.

Accordingly, using these approximations together with Equation (1), the 1-way 3 dB beamwidth—i.e. a beamwidth for one of either transmission or reception—of an antenna with aperture diameter a can be approximated by:

$$\phi_{3dB} = 25.5 \cdot \frac{\lambda}{a} deg \tag{2}$$

wherein the aperture diameter a would correspond to either the aperture size of an associated feed 28, the diameter of a flat-plate or patch of a flat-plate or patch antenna, or the diameter of an associated dielectric electromagnetic lens 40 for an antenna, for example, a multi-beam antenna 22, in cooperation therewith. For example, at 77 Ghz, a flat plate antenna having a diameter of 2.6 in. (6.6 cm) would have a 3 dB (1-way) beamwidth of 3° (±1.5°) and a 10 dB beamwidth of 5° (±2.5°). At 24 Ghz a flat plate having a diameter of 2.8 in. (7.11 cm) would have a much larger 3 dB (1-way) beamwidth of 9° (±4.5°) and a 10 dB beamwidth of 15° (±7.5°).

Using the above antenna approximation and calculated beamwidths, and assuming that the radar is mounted 2 ft. (0.61 m) above the ground, the ranges at which 3 dB and 10 dB attenuations occur—referred to as "beam falloff"—for ground targets can be calculated as follows.

| | | Beam Falloff Range | |
|---|---|---|---|
| 1-way attenuation | 2-way attenuation | 77 Ghz | 24 Ghz |
| 3 dB | 6 dB | 23 m (1.5°) | 7.7 m (4.5°) |
| 10 dB | 20 dB | 14 m (2.5°) | 4.7 m (7.5°) |

wherein 2-way attenuation refers to combined transmission and reception.

The relatively close falloff range associated with the relatively wider antenna beamwidth at 24 Ghz is noteworthy, because this attenuation occurs at a closer point in time to when the vehicle will actually reach or pass over the object, thereby increasing the likelihood of and associated false alarm; and because, independent of antenna effects, the signal power associated with a target increases as $1/r^4$ as the host vehicle 16 approaches the target, wherein r is the range to the target, which further reduces the likelihood of a target being dropped as a result of beam falloff.

For a host vehicle 16 traveling at 60 mph (26.8 m/s) the following table provides the amount of time before object crossover at which an object lying on the ground would achieve 6 dB and 20 dB for 2-way attenuation (or 3 dB and 10 dB for 1-way attenuation), for both 77 Ghz and 24 Ghz radar systems, wherein it can be seen that the time before object crossover is substantially lower for a relatively wider 24 Ghz antenna beam than for a relatively narrower 77 Ghz antenna beam:

| | | Time Before Crossover | |
|---|---|---|---|
| 1-way attenuation | 2-way attenuation | 77 Ghz | 24 Ghz |
| 3 dB | 6 dB | 860 ms | 287 ms |
| 10 dB | 20 dB | 522 ms | 175 ms |

The predictive collision radar system 10 is adapted so that the beam falloff range of at least a central beam of the multi-beam antenna 22 is sufficiently greater than the beam falloff range of the guard antenna 24 so as to provide for the detection of a false target 48 located therebetween. In the following description, a forward-looking multi-beam channel 54 is used as the source of the multi-beam channel signal. For a multi-beam antenna 22.1 with several forward-looking channels, for example, on either side of the associate longitudinal axis 50 as illustrated in FIGS. 1 and 2, then the associated processing can be performed separately for each forward-looking multi-beam channel 54. Alternatively, a single-beam antenna could be used in the forward-looking multi-beam channel 54.

For example, a 60° (±30°) 3 dB beamwidth can be approximated by setting a/λ=0.89 in Equation (1). For example, pages 225-226 of *Introduction to Radar Systems*, McGraw Hill, 1980 by Merrill I Skolnik, which is incorporated herein by reference, describes the relation between absolute antenna gain G and beamwidth, referring to equations similar to:

$$G = \frac{k}{\phi_{azimuth}\theta_{elevation}} \quad (3)$$

wherein φ and θ are the azimuth and elevation beamwidths, respectively, and G is the associated scalar gain. For example, at 24 Ghz, a 3.6 in. (9.14 cm) aperture exhibits a 9° (±4.5°) beamwidth and a corresponding gain of approximately 24 dBi. From Equation (3), a feed 28 having a 3 dB beamwidth of 60° (±30°), not focused by a dielectric electromagnetic lens, would have a corresponding peak antenna gain G of approximately of 13.5 dB.

Figure 4:
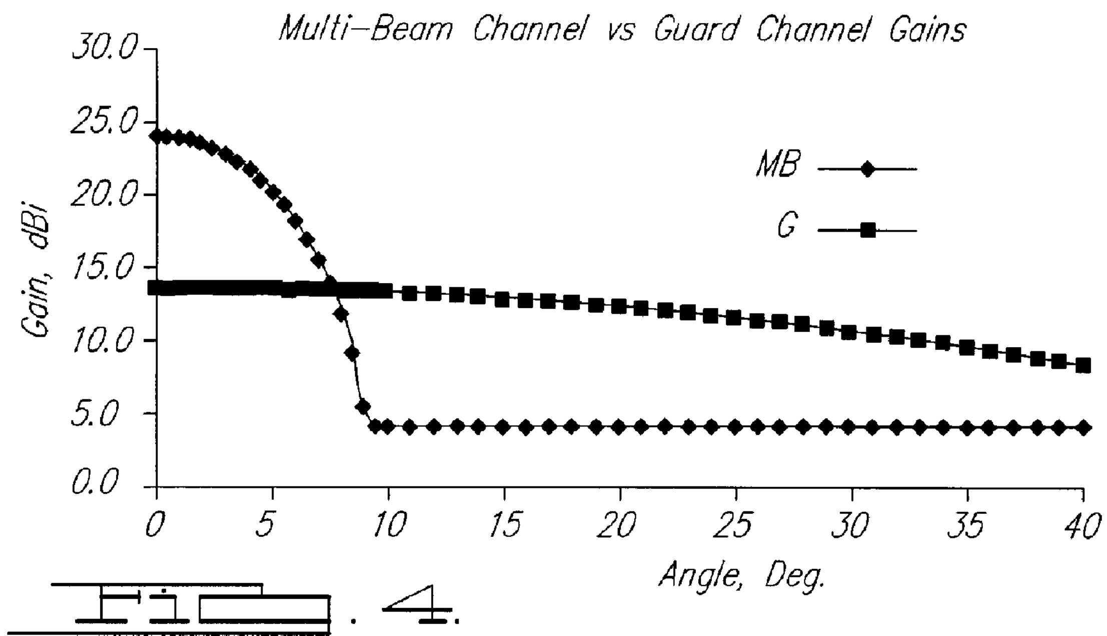
FIG. 4 illustrates an example of 1-way multi-beam and guard channel antenna patterns.

For example, FIG. 4 illustrates examples of the associated 1-way antenna patterns for the multi-beam channel (MB) and the guard channel (G) in plots of associated antenna gain G in dBi as a function of angle, φ or θ. The multi-beam channel has a 3 dB beamwidth of 9° (±4.5°) and a peak gain of 24 dBi, while the guard channel has a 3 dB beamwidth of 60° (±30°) and peak gain of 13.5 dBi, wherein, for this example, the antenna gains G of the multi-beam channel and the guard channel are equal at approximately 7.6° from beam center; and at beam center, the antenna gain G of the multi-beam channel exceeds that of the guard channel by about 10.5 dB.

Figure 5:
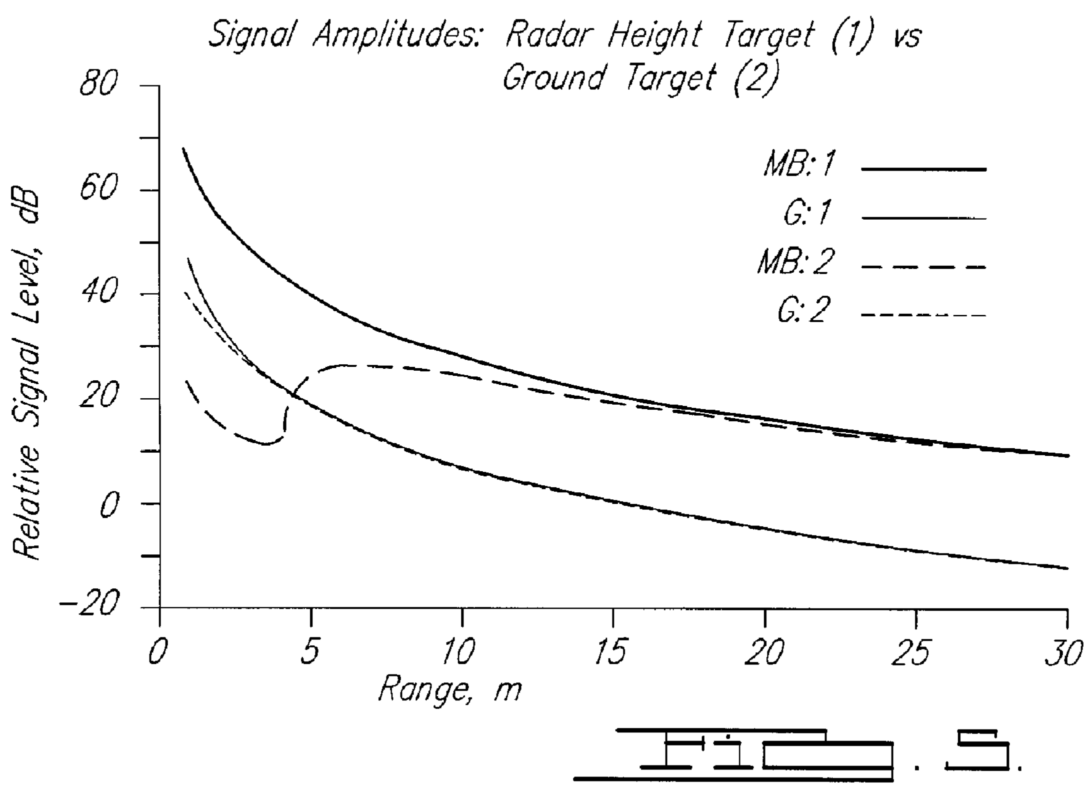
FIG. 5 illustrates examples of 2-way (transmit and receive) multi-beam and guard channel signals for two different target approach scenarios.
Figure 6:
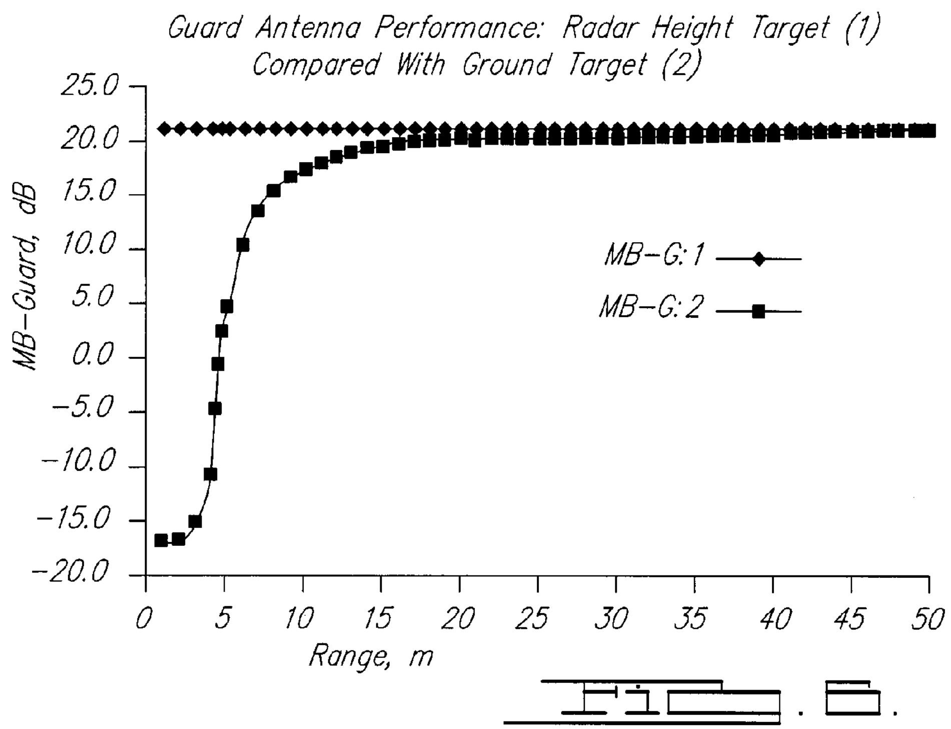
FIG. 6 illustrates difference signals for two different target heights, wherein a difference signal comprises a difference between a multi-channel signal and the associated guard signal.

FIG. 5 illustrates examples of the 2-way (transmit and receive) relative signal levels of a multi-beam channel signal and a guard channel signal as a function of the range along ground to a target, for two different target approach scenarios: a target at bumper height (case 1) and a target on the ground (case 2), with the center of the antenna system 20 located 2 ft. (0.61 m) above the ground; and FIG. 6 illustrates the corresponding difference between the multi-beam channel signal and a guard channel signal for each of these two cases. The $1/r^4$ signal amplitude resulting from range closure is accounted for, which results in increasing signal amplitude as range decreases. For case 1, with the target approaching at bumper height, the 2-way gain difference remains substantially fixed at about 21 dB—as illustrated in FIG. 6,—which is twice the 10.5 dB difference in the values of the 1-way gain patterns of the multi-beam channel and the guard channel illustrated in FIG. 4. For case 2, with the target approaching on the ground, the guard channel signal is substantially the same as for case 1 because of the relatively wider mainlobe of the associated beam; however, the multi-beam channel signal, deviates substantially from that of case 1 because the associated signal amplitude is attenuated as the ground target begins to move out of the relatively narrower mainlobe of the beam of the multi-beam channel. At approximately 4.5 m from the target, the elevation angle to the ground target is approximately 7.6°, and the multi-beam and guard channel antenna gains are equal, which corresponds to the gain "crossover" illustrated in FIG. 4.

Figure 7:
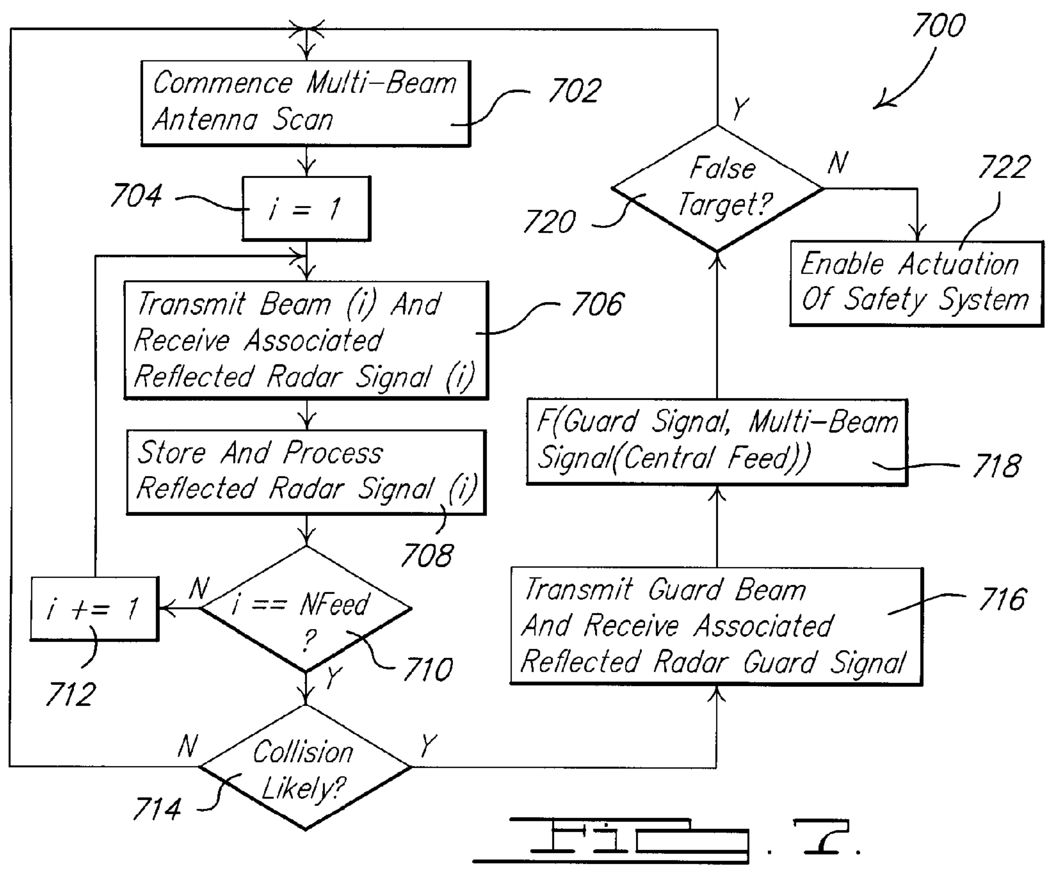
FIG. 7 illustrates a flow chart of a predictive collision sensing process.

Referring to FIG. 7, in accordance with a predictive collision sensing process 700, in step (702), scanning of the multi-beam antenna 22 commences with the initialization of a counter i in step (704), after which, in step (706), the $i^{th}$ feed 24 of the multi-beam antenna 22 is selected by the switching network 36 and coupled to the radar signal source and processor 42, so that, in step (708), a beam of electromagnetic energy is transmitted from the $i^{th}$ feed 24, and reflected electromagnetic energy is received thereby and processed by the radar signal source and processor 42. Then, in step (710), if all of the feeds 24 have not been processed, then, in step (712), the counter i is incremented, and the antenna scan process continues with a repeat of step (706) for the next feed 24. Otherwise, from step (710), if all of the feeds 24 of the multi-beam antenna 22 have been processed, then, in step (714), if responsive to the radar signals received from each of the feeds 24 in step (706) and processed by the radar signal source and processor 42, the predictive collision radar system 10 in the host vehicle 16 indicates a sufficiently high probability of collision with an object being tracked thereby, then a guard test is performed to verify whether or not object being tracked is a false target 48. More particularly, in step (716), a beam of electromagnetic energy is transmitted from the feed 26 of the guard antenna 22, and electromagnetic energy reflected by the environment is received thereby as the guard channel signal, and then, in step (718), the guard channel signal, or a function thereof, is compared with the corresponding multi-beam channel signal from a forward-looking multi-beam channel 54 of the multi-beam antenna 22, or a function thereof, for each forward-looking multi-beam channel 54. Then, in step (720), if responsive to the comparison in step (718) a false target 48 is detected, or if, from step (714), a collision was not likely, then the predictive collision sensing process 700 repeats with step (702).

For example, in one embodiment, if a factor k times the value of guard channel signal is greater than the value of the associated multi-beam channel signal from a forward-looking multi-beam channel 54, then the target would be identified as a false target 48 and subsequently ignored as being located beyond the main lobe of the multi-beam channel signal, and therefore not a threat to the host vehicle 16. For example, a false target 48 could be either a ground target or a target which the host vehicle 16 is expected to pass underneath, such as an overpass. In practice, the "crossover point" of the multi-beam and guard channel signals can be adjusted in either hardware or software, for example, by either changing the value of the factor k in software, or by changing the shape of an associated guard channel tapered slot feed 28 on the planar antenna system 20 illustrated FIG. 2. For example, the radiation pattern of the guard channel could be optimized to provide the most advantageous peak gain and beamwidth in order to optimize the crossover point, so as to provide for improved discrimination of false targets 48 from valid targets 52, and thereby providing for a reduction in false alarms or false alarm rates.

Figure 8:
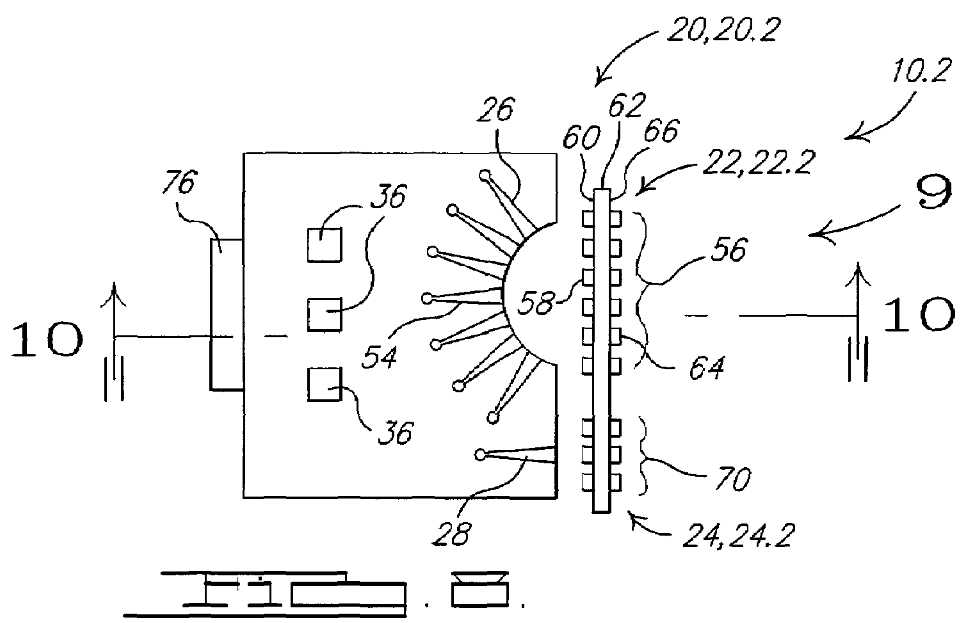
FIG. 8 illustrates a top view second embodiment of a multi-beam antenna and guard antenna combination in cooperation with a planar electromagnetic lens.
Figure 9:
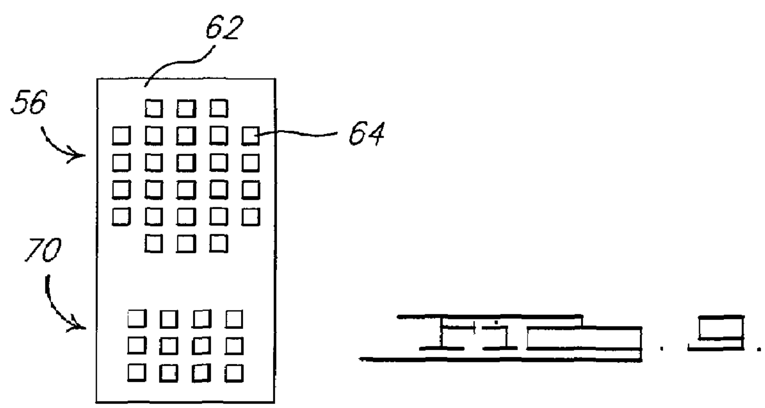
FIG. 9 illustrates a plan view of the planar electromagnetic lens incorporated in the second embodiment illustrated in FIG. 8.
Figure 10:
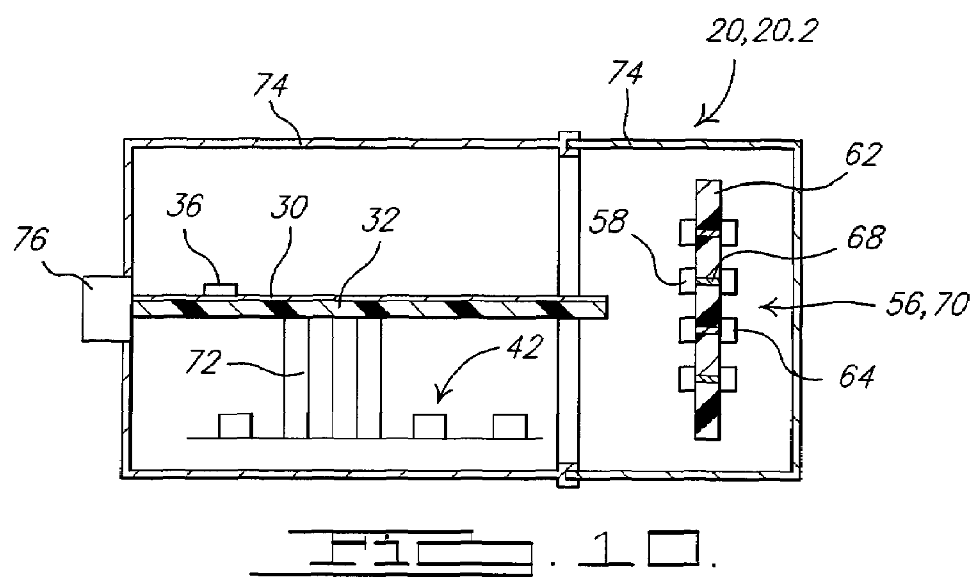
FIG. 10 illustrates a side cross-sectional view of a radar system incorporating the second embodiment illustrated in FIGS. 8 and 9.
Figure 11:
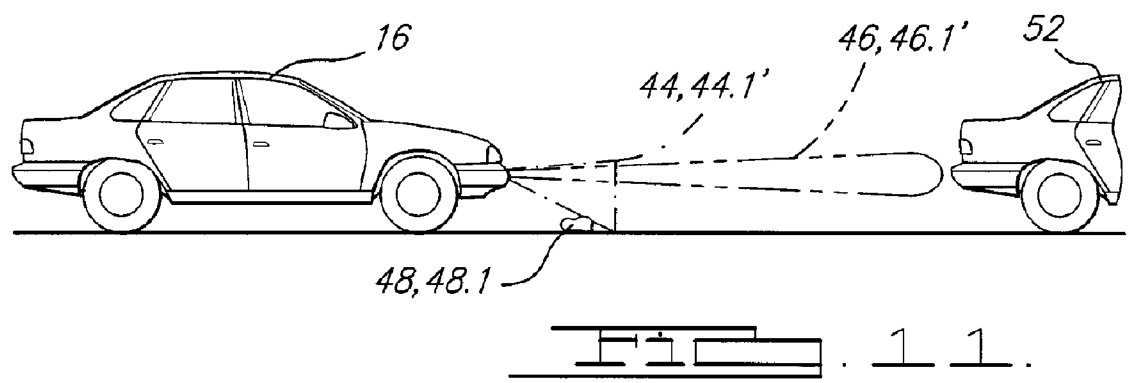
FIG. 11 illustrates a side view of elevation beam patterns of a beam of a multi-beam antenna and a beam of a second embodiment of a guard antenna.
Figure 12:
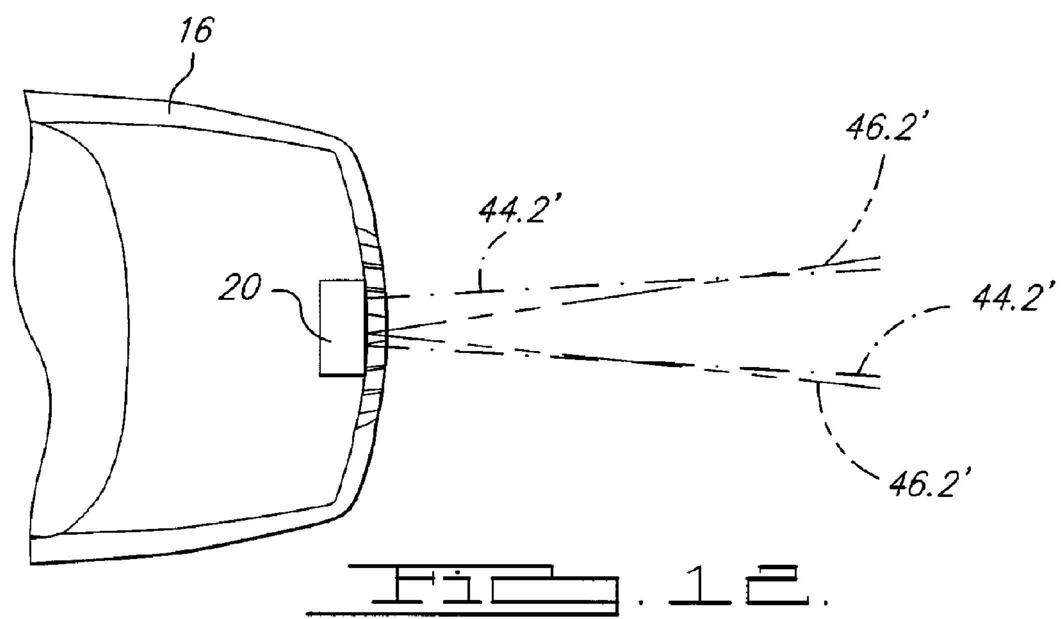
FIG. 12 illustrates a top view of azimuthal beam patterns of a beam of the multi-beam antenna and a beam of the second embodiment of a guard antenna.

Referring to FIGS. 8-10, in accordance with a second embodiment, the antenna system 20.2 comprises a second embodiment of a multi-beam antenna 22.2 and a second embodiment of a guard antenna 24.2. The second embodiment of the multi-beam antenna 22.2 incorporates a first planar electromagnetic lens 56, for example, in accordance with the teachings of U.S. application Ser. No. 11/161,681, which is incorporated herein by reference, wherein the planar electromagnetic lens 56 incorporates a first plurality of patch elements 58 on a first side 60 of a dielectric substrate or substrate assembly 62, interconnected to a corresponding second plurality of patch elements 64 on an opposing second side 66 of the dielectric substrate or substrate assembly 62, with delay elements 68 within the dielectric substrate or substrate assembly 62, wherein the delay elements 68 are adapted with respect to location of the associated first 58 and second 64 pluralities of patch elements so as to provide for associated phase delays that provide for focusing the associated beam of electromagnetic energy similar to that provided for by the dielectric electromagnetic lens 40 of the first embodiment of the antenna system 20.1. For example, in one embodiment, the delay elements 68 comprise conductive elements within or on the surface of the dielectric substrate or substrate assembly 62, which are connected to the associated first 58 and second 64 pluralities of patch elements with associated conductive vias, wherein the length of then conductive elements is adapted to provide for the associated phase delay associated with a particular set of first 58 and second 64 patch elements. Furthermore, the dielectric substrate or substrate assembly 62 may incorporate one or more conductive ground plane layers within. Otherwise, the antenna feeds 26 of the second embodiment of the multi-beam antenna 22.2 are similar to those of the first embodiment of the multi-beam antenna 22.2 described hereinabove. The second embodiment of the guard antenna 24.2 also incorporates a second planar electromagnetic lens 70 similar in construction to that the first planar electromagnetic lens 56 described hereinabove, but with associated phase delays adapted to the operation of the guard antenna 24.2, for example, a phase delays that increases downwardly across the elements of the second planar electromagnetic lens 70 as installed in the host vehicle 16 adapted so as to direct the associated elevation radiation pattern 44.1' either downwards to better detect ground level objects, as illustrated in FIG. 11, or upwards to better detect overhead objects. For example, the first 56 and second 70 planar electromagnetic lenses are constructed using a common dielectric substrate or substrate assembly 62. Furthermore, the second planar electromagnetic lens 70 may be adapted to provide for azimuthally focusing the beam from the guard antenna 24.2. For example, referring to FIG. 12, in one embodiment, the first 56 and second 70 planar electromagnetic lenses are adapted so that the associated azimuthal radiation patterns 44.2', 46.2' of the guard antenna 24 and the forward-looking multi-beam channel 54 of the multi-beam antenna 22 are substantially similar in extent and orientation.

Referring to FIG. 10, in one embodiment, the antenna system 20.2 is located on one board plane and is operatively coupled with an interconnect cable 72 to the associated radar signal source and processor 42 on another board plane, all of which together with the associated first 56 and second 68 planar electromagnetic lenses is enclosed in an associated two-part housing 74. The radar signal source and processor 42 is operatively coupled via an associated connector 76, to the safety system control processor 12.

The predictive collision radar system 10 comprising a guard antenna 24 can be adapted to provide for reducing false alarms from targets on the roadway surface over which the host vehicle 16 would normally pass; objects which the host vehicle 16 will pass underneath, such as bridges; and objects which the host vehicle 16 will pass closely by, such as other vehicles or construction barrels. The guard antenna 24 and guard test can be adapted to reject false targets 48 which are separated in either azimuth or elevation relative to the position of the radar. For example, in one embodiment with the guard antenna 24 adapted to provide for a substantially wider associated azimuthal radiation pattern than the associated multi-beam antenna 22, the associated guard test can be adapted so as to also provide for reducing false alarms from potential false targets 48 at the height of the predictive collision radar system 10, but which would not otherwise collide with the host vehicle 16.

The antenna system 20 generally comprises the combination of a first antenna with a guard antenna 24. Although the first antenna has been illustrated herein as a multi-beam antenna 22, it should be understood that in an alternative embodiment, the first antenna could comprise a single beam antenna that is either scanned relative to the beam of the guard antenna 24, or relatively fixed with respect thereto, wherein in a scanned embodiment, the guard test would be performed using the multi-beam channel signal obtained when the scanned beam from the first antenna was substantially aligned with respect to the beam from the guard antenna 24. In another possible alternative embodiment, the guard antenna 24 could also comprise a multi-beam antenna so as to provide for a plurality of guard tests in a plurality of different directions, wherein each guard test would be performed with corresponding beams from the first antenna and the guard antenna 24 that overlap with one another. In yet another possible embodiment, the guard antenna 24 could comprise a plurality of guard antennas 24, each having a corresponding fan-shaped beam that extends beyond the associated beam of the first antenna in a different direction so as to provide for distinguishing false targets 48 located in different directions with respect to the antenna system 20, for example, so as to provide for distinguishing ground targets from overhead targets or false targets 48 located on either side of the host vehicle 16.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth the appended claims, and any and all equivalents thereof.

What is claimed is:

1. A method of detecting a target with a radar system, comprising:

a. generating a first beam of electromagnetic radiation in at least one first direction;

b. generating a second beam of electromagnetic radiation in at least one second direction, wherein a second direction of said at least one second direction is substantially aligned with a first direction of said at least one first direction, said second beam of electromagnetic radiation in said second direction overlaps a main lobe of said first beam of electromagnetic radiation in said first direction, said main lobe of said first beam of electromagnetic radiation in said first direction is adapted to illuminate a valid target to be detected by said radar system, and a substantial portion of said second beam of electromagnetic radiation extends beyond said first beam of electromagnetic radiation in at least one third direction so as to provide for illuminating a false target to be ignored by said radar system;

c. focusing at least one of said first beam of electromagnetic radiation and said second beam of electromagnetic radiation in at least one direction;

d. generating a first signal responsive to receiving first reflected electromagnetic radiation of said first beam of electromagnetic radiation, wherein said first reflected electromagnetic radiation is reflected by an environment of said radar system;

e. generating a second signal responsive to receiving second reflected electromagnetic radiation of said second beam of electromagnetic radiation, wherein said second reflected electromagnetic radiation is reflected by said environment of said radar system; and f. processing said first and second signals so as to provide for discriminating said valid target from said false target.

2. A radar system, comprising:

a. at least one first antenna feed element adapted to transmit and receive a corresponding at least one first beam of electromagnetic radiation in at least one first direction, wherein said at least one first antenna feed element comprises a plurality of first antenna feed elements oriented in a corresponding plurality of different first directions;

b. at least one second antenna feed element adapted to transmit and receive a corresponding at least one second beam of electromagnetic radiation in at least one second direction, wherein said second beam of electromagnetic radiation in said second direction overlaps a main lobe of said first beam of electromagnetic radiation in said first direction, said main lobe of said first beam of electromagnetic radiation in said first direction is adapted to illuminate a valid target to be detected by said radar system, and a substantial portion of said second beam of electromagnetic radiation extends beyond said first beam of electromagnetic radiation in at least one third direction so as to provide for illuminating a false target to be ignored by said radar system; and c. a processor, wherein said processor is adapted to receive a first signal received by a first antenna feed element of said at least one first antenna feed element, said processor is adapted to receive a second signal received by a second antenna feed element of said at least one second antenna feed element, wherein a direction of said first beam of electromagnetic radiation of said at least one first beam of electromagnetic radiation generated by said first antenna feed element is substantially similar to a direction of said second beam of electromagnetic radiation of said at least one second beam of electromagnetic radiation generated by said second antenna feed element, said first signal is responsive to reflected energy from said first beam of electromagnetic radiation, and said second signal is responsive to reflected energy from said second beam of electromagnetic radiation, said processor provides for processing said first and second signals so as to distinguish said valid target from said false target, wherein said valid target would be illuminated by both said first and second beams of electromagnetic radiation when said false target is illuminated substantially only by said second beam of electromagnetic radiation.

3. A radar system comprising:

a. at least one first antenna feed element adapted to transmit and receive a corresponding at least one first beam of electromagnetic radiation in at least one first direction, wherein said at least one first antenna feed element comprises a plurality of first antenna feed elements oriented in a corresponding plurality of different first directions;

b. at least one second antenna feed element adapted to transmit and receive a corresponding at least one second beam of electromagnetic radiation in at least one second direction, wherein said second beam of electromagnetic radiation in said second direction overlaps a main lobe of said first beam of electromagnetic radiation in said first direction, said main lobe of said first beam of electromagnetic radiation in said first direction is adapted to illuminate a valid target to be detected by said radar system, and a substantial portion of said second beam of electromagnetic radiation extends be beyond said first beam of electromagnetic radiation in at least one third direction so as to provide for illuminating a false target to be ignored by said radar system; and c. a processor, wherein said processor is adapted to receive a first signal received by a first antenna feed element of said at least one first antenna feed element, said processor is adapted to receive a second signal received by a second antenna feed element of said at least one second antenna feed element, wherein a direction of said first beam of electromagnetic radiation of said at least one first beam of electromagnetic radiation generated by said first antenna feed element is substantially similar to a direction of said second beam of electromagnetic radiation of said at least one second beam of electromagnetic radiation generated by said second antenna feed element, said first signal is responsive to reflected energy from said first beam of electromagnetic radiation, and said second signal is responsive to reflected energy from said second beam of electromagnetic radiation, said processor provides for processing said first and second signals so as to distinguish said valid target from said false target, wherein said valid target would be illuminated by both said first and second beams of electromagnetic radiation when said false target is illuminated substantially only by said second beam of electromagnetic radiation; and d. a first electromagnetic lens adapted to cooperate with said at least one first antenna feed element so as to provide for focusing said at least one first beam of electromagnetic radiation.

4. A radar system as recited in claim 3, wherein said first electromagnetic lens comprises a dielectric lens.

5. A radar system as recited in claim 4, wherein said dielectric lens comprises a spherical lens.

6. A radar system as recited in claim 4, wherein said first electromagnetic lens comprises a first planar electromagnetic lens comprising:

a. a plurality of corresponding first and second conductive patch elements;

b. at least one dielectric substrate, wherein said first and second conductive patch elements are separated from one another by said at least one dielectric substrate; and a plurality of first delay elements, wherein each first delay element of said plurality of first delay elements is operative between corresponding said first and second conductive patch elements, and said plurality of first delay elements are adapted to provide for focusing said at least one first beam of electromagnetic radiation.

7. A radar system as recited in claim 6, further comprising a second electromagnetic lens adapted to cooperate with said at least one second antenna feed element so as to provide for focusing said at least one second beam of electromagnetic radiation in at least one direction.

8. A radar system as recited in claim 7, wherein said second electromagnetic lens comprises a second planar electromagnetic lens comprising:

a. a plurality of corresponding third and fourth conductive patch elements;

b. at least one dielectric substrate, wherein said third and fourth conductive patch elements are separated from one another by said at least one dielectric substrate; and c. a plurality of second delay elements, wherein each second delay element of said plurality of second delay elements operative between corresponding said third and fourth conductive patch elements, and said plurality of second delay elements are adapted to provide for focusing said at least one second beam of electromagnetic radiation.

9. A radar system as recited in claim 8, wherein said plurality of corresponding first and second conductive patch elements are interconnected by a corresponding said plurality of first delay elements.

10. A radar system as recited in claim 8, wherein said plurality of corresponding third and fourth conductive patch elements are interconnected by a corresponding said plurality of second delay elements.

11. A radar system as recited in claim 6, wherein said plurality of corresponding first and second conductive patch elements are interconnected by a corresponding said plurality of first delay elements.

12. A radar system, comprising:

a. at least one first antenna feed element adapted to transmit and receive a corresponding at least one first beam of electromagnetic radiation in at least one first direction, wherein said at least one first antenna feed element comprises a plurality of first antenna feed elements oriented in a corresponding plurality of different first directions;

b. at least one second antenna feed element adapted to transmit and receive a corresponding at least one second beam of electromagnetic radiation in at least one second direction, wherein said second beam of electromagnetic radiation in said second direction overlaps a main lobe of said first beam of electromagnetic radiation in said first direction, said main lobe of said first beam of electromagnetic radiation in said first direction is adapted to illuminate a valid target to be detected by said radar system, and a substantial portion of said second beam of electromagnetic radiation extends beyond said first beam of electromagnetic radiation in at least one third direction so as to provide for illuminating a false target to be ignored by said radar system, wherein said at least one first antenna feed element and said at least one second antenna feed element are operatively associated with a first dielectric substrate; and c. a processor, wherein said processor is adapted to receive a first signal received by a first antenna feed element of said at least one first antenna feed element, said processor is adapted to receive a second signal received by a second antenna feed element of said at least one second antenna feed element, wherein a direction of said first beam of electromagnetic radiation of said at least one first beam of electromagnetic radiation generated by said first antenna feed element is substantially similar to a direction of said second beam of electromagnetic radiation of said at least one second beam of electromagnetic radiation generated by said second antenna feed element, said first signal is responsive to reflected energy from said first beam of electromagnetic radiation, and said second signal is responsive to reflected energy from said second beam of electromagnetic radiation, said processor provides for processing said first and second signals so as to distinguish said valid target from said false target, wherein said valid target would be illuminated by both said first and second beams of electromagnetic radiation when said false target is illuminated substantially only by said second beam of electromagnetic radiation.

13. A radar system, comprising:

a. at least one first antenna feed element adapted to transmit and receive a corresponding at least one first beam of electromagnetic radiation in at least one first direction, wherein said at least one first antenna feed element comprises a plurality of first antenna feed elements oriented in a corresponding plurality of different first directions;

b. at least one second antenna feed element adapted to transmit and receive a corresponding at least one second beam of electromagnetic radiation in at least one second direction, wherein said second beam of electromagnetic radiation in said second direction overlaps a main lobe of said first beam of electromagnetic radiation in said first direction, said main lobe of said first beam of electromagnetic radiation in said first direction is adapted to illuminate a valid target to be detected by said radar system, and a substantially portion of said second beam of electromagnetic radiation extends beyond said first beam of electromagnetic radiation in at least one third direction so as to provide for illuminating a false target to be ignored by said radar system; and c. a processor, wherein said processor is adapted to receive a first signal received by a first antenna feed element of said at least one first antenna feed element, said processor is adapted to receive a second signal received by a second antenna feed element of said at least one second antenna feed element, wherein a direction of said first beam of electromagnetic radiation of said at least one first beam of electromagnetic radiation generated by said first antenna feed element is substantially similar to a direction of said second beam of electromagnetic radiation of said at least one second beam of electromagnetic radiation generated by said second antenna feed element, said first signal is responsive to reflected energy from said first beam of electromagnetic radiation, and said second signal is responsive to reflected energy from said second beam of electromagnetic radiation, said processor provides for processing said first and second signals so as to distinguish said valid target from said false target, wherein said valid target would be illuminated by both said first and second beams of electromagnetic radiation when said false target is illuminated substantially only by said second beam of electromagnetic radiation; and d. a second electromagnetic lens adapted to cooperate with said at least one second antenna feed element so as to provide for focusing said at least one second beam of electromagnetic radiation in at least one direction.

14. A radar system as recited in claim 13, wherein said second electromagnetic lens comprises a second planar electromagnetic lens comprising:

a. a plurality of corresponding third and fourth conductive patch elements;

b. at least one dielectric substrate, wherein said third and fourth conductive patch elements are separated from one another by said at least one dielectric substrate; and c. a plurality of second delay elements, wherein each second delay element of said plurality of second delay elements is operative between corresponding said third and fourth conductive patch elements, and said plurality of second delay elements are adapted to provide for focusing said at least one second beam of electromagnetic radiation.

15. A radar system as recited in claim 14, wherein said plurality of corresponding third and fourth conductive patch elements are interconnected by a corresponding said plurality of second delay elements.

16. A method of detecting a target with a radar system, comprising:

a. generating a plurality of first beams of electromagnetic radiation in a corresponding plurality of first directions;

b. generating at least one second beam of electromagnetic radiation in at least one second direction, wherein a second direction of said at least one second direction is substantially aligned with at least one first direction of said plurality of first directions, said at least one second beam of electromagnetic radiation in said at least one second direction overlaps a main lobe of at least one first beam of electromagnetic radiation of said plurality of first beams of electromagnetic radiation in a corresponding at least one first direction of said plurality of first directions, said main lobe of said at least one first beam of electromagnetic radiation in said at least one first direction is adapted to illuminate a valid target to be detected by said radar system, and a substantial portion of said at least one second beam of electromagnetic radiation extends beyond said at least one first beam of electromagnetic radiation in at least one third direction so as to provide for illuminating a false target to be ignored by said radar system;

c. generating a first signal responsive to receiving first reflected electromagnetic radiation of said at least one first beam of electromagnetic radiation, wherein said first reflected electromagnetic radiation is reflected by an environment of said radar system;

d. generating a second signal responsive to receiving second reflected electromagnetic radiation of said at least one second beam of electromagnetic radiation, wherein said second reflected electromagnetic radiation is reflected by said environment of said radar system; and e. processing said first and second signals so as to provide for discriminating said valid target from said false target.

* * * * *

UNITED STATES PATENT AND TRADEMARK OFFICE

CERTIFICATE OF CORRECTION

PATENT NO. : 7,411,542 B2
APPLICATION NO. : 11/307531
DATED : August 12, 2008
INVENTOR(S) : Michael E. O'Boyle It is certified that error appears in the above-identified patent and that said Letters Patent is hereby corrected as shown below:

In the Claims

Column 10, Line 18, Claim 3,
"be" should be deleted.

Column 10, Line 62, Claim 6,
--c.-- should be inserted before "a plurality".

Column 11, Line 16, Claim 8,
--is-- should be inserted after "elements".

Column 12, Line 30, Claim 13,
"substantially" should be changed to --substantial--.

Signed and Sealed this
Twenty-first Day of July, 2015

Michelle K. Lee

Michelle K. Lee
*Director of the United States Patent and Trademark Office*